US012683869B2

(12) United States Patent
SethuRamasamy et al.

(10) Patent No.: US 12,683,869 B2
(45) Date of Patent: Jul. 14, 2026

(54) MACHINE LEARNING LANGUAGE BASED DYNAMIC NETWORK DISCOVERY

(71) Applicant: Fortinet, Inc., Sunnyvale, CA (US)

(72) Inventors: Venugopal SethuRamasamy, Bangalore (IN); Shashikiran G. Shirole, Ganapati nagar (IN)

(73) Assignee: Fortinet, Inc., Sunnyvale, CA (US)

( * ) Notice: Subject to any disclaimer, the term of this patent is extended or adjusted under 35 U.S.C. 154(b) by 768 days.

(21) Appl. No.: 18/126,597

(22) Filed: Mar. 27, 2023

(65) Prior Publication Data

US 2024/0333600 A1 Oct. 3, 2024

(51) Int. Cl.
 *H04L 45/00* (2022.01)
 *H04L 41/16* (2022.01)
 *H04L 43/10* (2022.01)
(52) U.S. Cl.
 CPC .............. *H04L 41/16* (2013.01); *H04L 45/20* (2013.01)
(58) Field of Classification Search
 CPC .......... H04L 41/16; H04L 45/20; H04L 43/10
 See application file for complete search history.

(56) References Cited

U.S. PATENT DOCUMENTS

| | | | |
|---|---|---|---|
| 2015/0229733 A1* | 8/2015 | Yang | H04L 67/5682 709/213 |
| 2022/0053407 A1* | 2/2022 | Zhou | H04L 45/54 |
| 2022/0092067 A1* | 3/2022 | Zhu | G06F 16/2453 |
| 2022/0197823 A1* | 6/2022 | Cho | G06F 12/0871 |

OTHER PUBLICATIONS

TTL Prediction Schemes and the Effects of Inter-Update Time Distribution on Wireless Data Access (Year: 2004).*

* cited by examiner

*Primary Examiner* — Shirley X Zhang
(74) *Attorney, Agent, or Firm* — Law Office of Dorian Cartwright; Dorian Cartwright

(57) ABSTRACT

An adaptive TTL model is generated from connection events, based on varying flight delay times for connecting the device manager to a plurality of managed devices. During a connection event for any of the plurality of managed devices, a TTL value is automatically chosen for the connection event from the adaptive TTL model.

13 Claims, 6 Drawing Sheets

DEVICE MANAGER
110

TTL Modeling Module
210

Training Module
212

Flight Time Module
214

Machine Learning Module
216

TTL Updating Module
220

400

330

FROM
STEP 320

COLLECT TRAINING DATA FROM
SUCCESSFUL DISCOVERIES
410

COLLECT TRAINING DATA FROM
UNSUCCESSFUL DISCOVERIES
420

DETERMINING A FLIGHT TIME PORTION FOR
SUCCESSFUL DISCVORIES
430

UTILIZING MACHINE LEARNING TO PREDICT
TTL VALUES NEEDED FOR CONNECTION
EVETNS
440

RETURN

330

FROM STEP 410

DETERMINE A CURRENT FLIGHT DELAY TIME BETWEEN DEVICE MANAGER AND A SPECIFIC MANAGED DEVICE
510

DETERMINE A SPECIFIC LOCATION OF THE SPECIFIC MANAGED DEVICE
520

SET A PREDICTED TTL VALUE FOR A CONNECTIO EVENT BASED ON TEH CURRENT FLIGHT TIME AND THE SPECIFIC LOCATION
530

TO STEP 430

MACHINE LEARNING LANGUAGE BASED DYNAMIC NETWORK DISCOVERY

FIELD OF THE INVENTION

The invention relates generally to computer networks, and more specifically, to utilizing machine learning to dynamically set TTL (Time-To-Live) values for connection events to a plurality of devices managed by the network device manager over a data communication network.

BACKGROUND

In a network architecture, managing devices are at a top level of a hierarchy to oversee backend network operations performed by numerous lower-level network devices. This gives a network administrator a single point of visibility for the network in order to monitor its current status and configure operations. To do so, a managing devices needs to discover and track the lower-level network devices as the landscape changes from new devices come online, change locations, and go offline.

A TTL value is set as a maximum amount of time that a network packet stays active for delivering its contents to a remote destination. Network packets transmitted for the purpose of discovering of network devices that are remotely managed can expire or time out if the network delay is too high, resulting in a failed connection.

Problematically, a default TTL value set statically for the wide array of connection circumstances can result in multiple failures and poor network performance due to slow discovery processes. For example, connection times to a network device located across the globe in Australia can be very different from connection times to a network device on the same LAN or in the same country. Individual assignments of time outs is labor intensive when there are lots of network devices having different factors causing network delays. Furthermore, network delays are dynamic due to conditions that constantly change outside of a local network, such as traffic levels and routing changes.

What is needed is a robust technique for using machine learning to dynamically set TTL values for connection events to a plurality of devices managed by the network device manager over a data communication network.

SUMMARY

To meet the above-described needs, methods, computer program products, and systems for using machine learning to dynamically set TTL values for connection events to a plurality of devices managed by the network device manager over a data communication network.

In one embodiment, an adaptive TTL model is generated from connection events between a device manager and managed devices. The model is based on varying flight delay times for connecting the device manager to a plurality of managed devices. Data is collected from successful discovery events, including a TTL value, a flight delay time determined from a ping, a traceroute or other technique, and in some instances, a location of a managed device. Machine learning can be employed to predict TTL values for various locations and for different flight delay times.

In another embodiment, during a connection event for any of the plurality of managed devices, a TTL value is automatically chosen for the connection event from the adaptive TTL model. A current flight time is determined, along with a location, as inputs to predicting a TTL value needed for a current or upcoming connection event.

Advantageously, network performance and computer performance are improved with more successful connection events.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for using machine learning to dynamically set TTL values for connection events to a plurality of devices managed by the network device manager over a data communication network. One of ordinary skill in the art will recognize many alternative embodiments that are not explicitly listed based on the following disclosure.

I. Systems for Machine Learning TTL Value Configuration (FIGS. 1-2)

Figure 1:
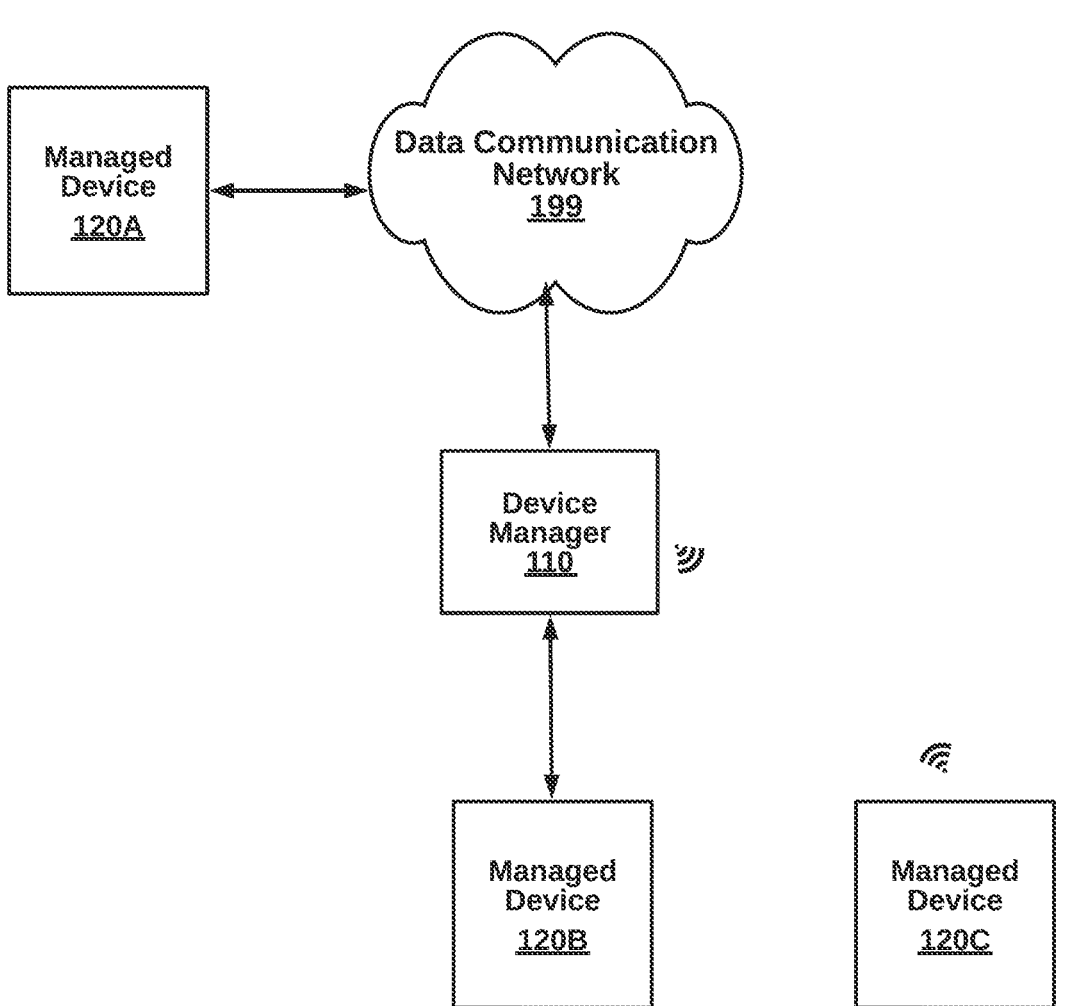
FIG. 1 is a high-level block diagram illustrating a system for using machine learning to dynamically set TTL values for connection events to a plurality of devices managed by the network device manager over a data communication network, according to one embodiment.
Figure 2:
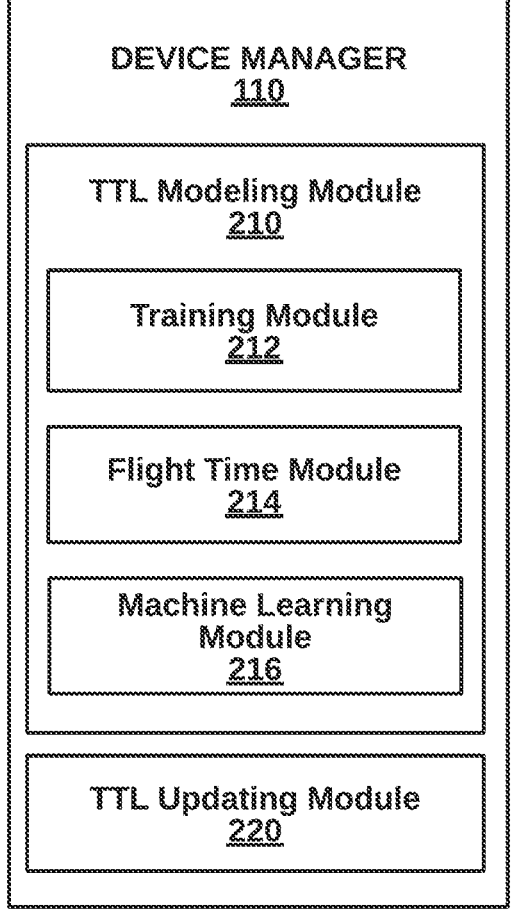
FIG. 2 is a more detailed block diagram illustrating a network device manager of the system of FIG. 1, according to one embodiment.
Figure 6:
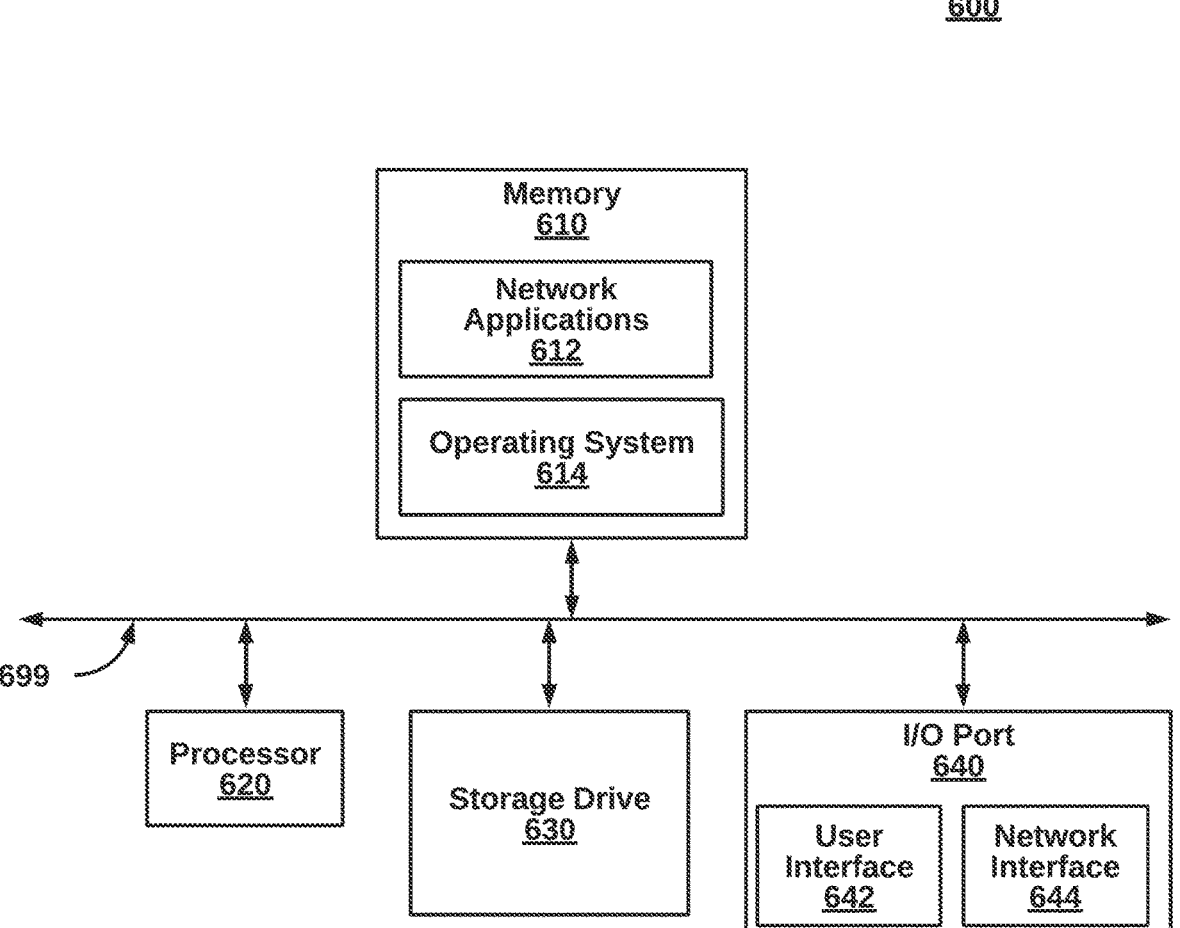
FIG. 6 is a block diagram illustrating an example computing device for machine learning TTL value configuration, in the system of FIG. 1, according to one embodiment.

FIG. 1 is a high-level block diagram illustrating a system 100 for using machine learning to dynamically set TTL values for connection events to a plurality of devices managed by the network device manager over a data communication network, according to one embodiment. The system 100 includes a device manager 110 and managed devices 120A-C. Other embodiments of the system 100 can include additional components that are not shown in FIG. 1, such as controllers, network gateways, firewalls, access points and stations. The components of system 100 can be implemented in hardware, software, or a combination of both. An example implementation is shown in FIG. 6.

In one embodiment, the components of the automatic system 100 are coupled in communication over a private network connected to a public network, such as the Internet. In another embodiment, system 100 is an isolated, private network. The components can be connected to the data communication system via hard wire (e.g., device manager 110 and managed devices 120A, B). The components can also be connected via wireless networking (e.g., managed device 120C). The data communication network can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or IPv6 address spaces.

The device manager 110 generates a TTL model with machine language used for subsequent connections to managed devices. During an initial connection, a reconnection, or a keep alive operation, a predicted TTL can be retrieved for more efficient connections rather than using a default TTL. An initial connection is made during discovery of a managed device by logging-in using SSL or other mechanisms. A keep alive connection can be a periodic check in to make sure a managed device is still responsive. A reconnection may be necessary due to power off, a restart or other loss of connections. Below, Table 1 lists a sample set of machine learning supervised data set. The machine learning can be implemented with artificial intelligence, recursive neural networking, stochastic modeling, or the like.

TABLE 1

| Machine Learning Supervised Data Set Sample for Dynamic Discovery | | |
|---|---|---|
| Value | Login | Keep alive |
| Initial - Default (~15-20 msec) | 1 sec | 300 msec |
| If delay is 100 msec | 5 sec | 600 msec |
| If delay is 200 msec | 10 sec | 1200 msec |
| If delay is 300 msec | 20 sec | 2400 msec |
| If delay is 400 msec | 40 sec | 4800 msec |

A TTL value in a data packet is preferably set larger than a connection time, otherwise, the data packet will expire. The connection time includes a flight time from a device manager 110 to a managed device plus a log-in time. In one embodiment, the flight time is variable and the log-in time is static. In another embodiment, the log-in time varies as well.

The device manager 110 can be a network gateway that discovers and maintains connections to managed devices 120A-C for monitoring, configuring, managing, controlling or the like. For example, a network administrator can log-in to the device manager 110 to make a policy change across the entire network. Furthermore, a status of all devices, such as online, offline, processing load, memory load, and throughput can be quickly ascertained. In another example, a device being added to the network can be configured through a user interface and set up to confirm with networkwide policies.

The device manager 110 can be connected to local devices such as managed device 120B and managed device 120C. The connections can be wired, as with managed device 120B or wireless, as with managed device 120C. The device manager 110 can also connect over the cloud remotely, as with managed device 120A. The managed devices 120A-C can be any network device, such as a firewall, an access point, a Wi-Fi controller, a router, a switch, or a station.

FIG. 2 is a more detailed block diagram illustrating the network device manager 120 of the system of FIG. 1, according to one embodiment. The network device 110 includes a TTL modeling module 210 and a TTL updating module 220. The components can be implemented in hardware, software, or a combination of both.

The TTL modeling module 210 to generate an adaptive TTL model from connection events, based on varying flight delay times for connecting the device manager to a plurality of managed device. The TTL modeling module 210 further comprises a training module 212 to collect training data by detecting successful discoveries of any of the plurality of managed devices at various locations on the data communication network. The TTL values associated with the successful discoveries can be stored at various locations in a TTL database. A TTL value is set to account for a flight delay time and a log-in time prior to expiration of a data packet. The flight delay time includes a period for data packets to traverse over the data communication network between the device manager and any of the plurality of managed devices and a period for logging in of the network device manager to any of the plurality of managed device.

The training module 212 collects training data by detecting failed discoveries of any of the plurality of managed devices at various locations, and detecting iterations of a TTL value needed to reach a successful discovery. A default value is set as an initial TTL value. After each failure, the TTL value can be increased and a new connection attempt is initiated until successful. The TTL value iterations at various locations are stored in the TTL database. In some embodiments, a maximum TTL value is set and a managed device is considered unreachable above the threshold (e.g., 5 seconds). In another case, the connection can fail if the host is unknown.

Responsive to the successful discoveries, a flight time module 214 determines a flight time portion for the successful discovery using a ping or a traceroute. The ping or the traceroute includes the flight delay time portion of successful discoveries without a login portion of successful discoveries. The flight delay time portion is stored in the TTL database, the flight delay time being approximately half of the round-trip time for a ping or traceroute. A machine learning module 216 uses a machine learning to predict TTL values needed for connection events over various flight delay times at various locations. Various artificial intelligence techniques can be utilized depending on the specific implementation.

The TTL updating module 220, during a connection event for any of the plurality of managed devices, can automatically update a TTL value for the connection event from the adaptive TTL model. A current flight delay time between the device manager and a specific managed device is determined. A specific location of the specific managed device is determined. A TTL value I set for the connection event from predicted TTL values, using the current flight delay time and the specific location.

II. Methods for Machine Learning TTL Value Configuration (FIGS. 3-5)

Figure 3:
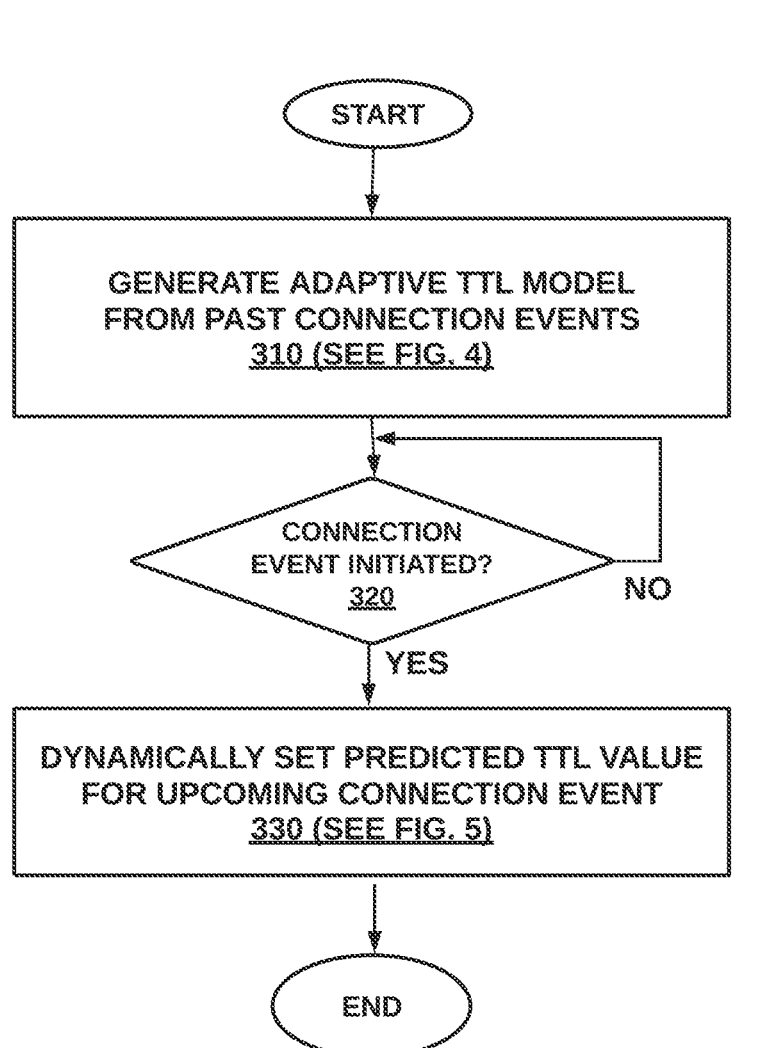
FIG. 3 is a high-level flow diagram illustrating a method for dynamically setting TTL values, according to an embodiment.

FIG. 3 is a high-level flow diagram for using machine learning to determine TTL values, in an embodiment. The method 300 can be implemented by, for example, system 100 of FIG. 1. The specific grouping of functionalities and order of steps are a mere example as many other variations of method 300 are possible, within the spirit of the present disclosure.

At step 310, an adaptive TTL model is generated from connection events, as detailed below in FIG. 4. A list of connection events between a device manager and managed devices can be collected, along with the parameters for connections. At step 320, responsive to initiating a connection event, at step 330, predicted TTL values are dynamically set for upcoming connection events, as detailed below in FIG. 5. The connection events can include initial connections, re-connections, and keep alive connections. In one embodiment, predicted TTL values are set and updated periodically, prior to or in anticipation of, the connection event.

Figure 4:
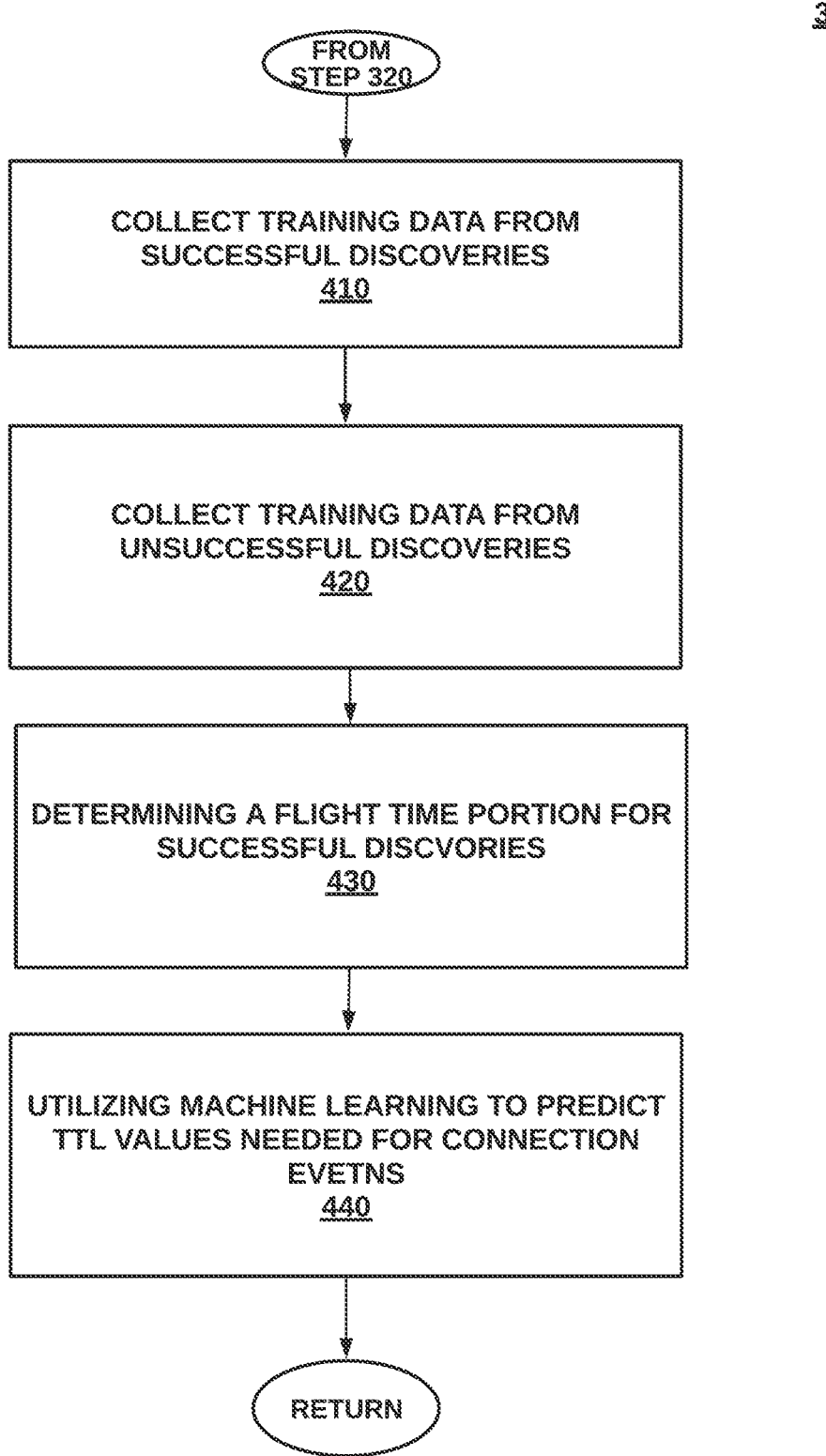
FIG. 4 is a more detailed flow diagram illustrating a step for generating an adaptive TTL model from past connection events, from the method of FIG. 3, according to one embodiment.
Figure 5:
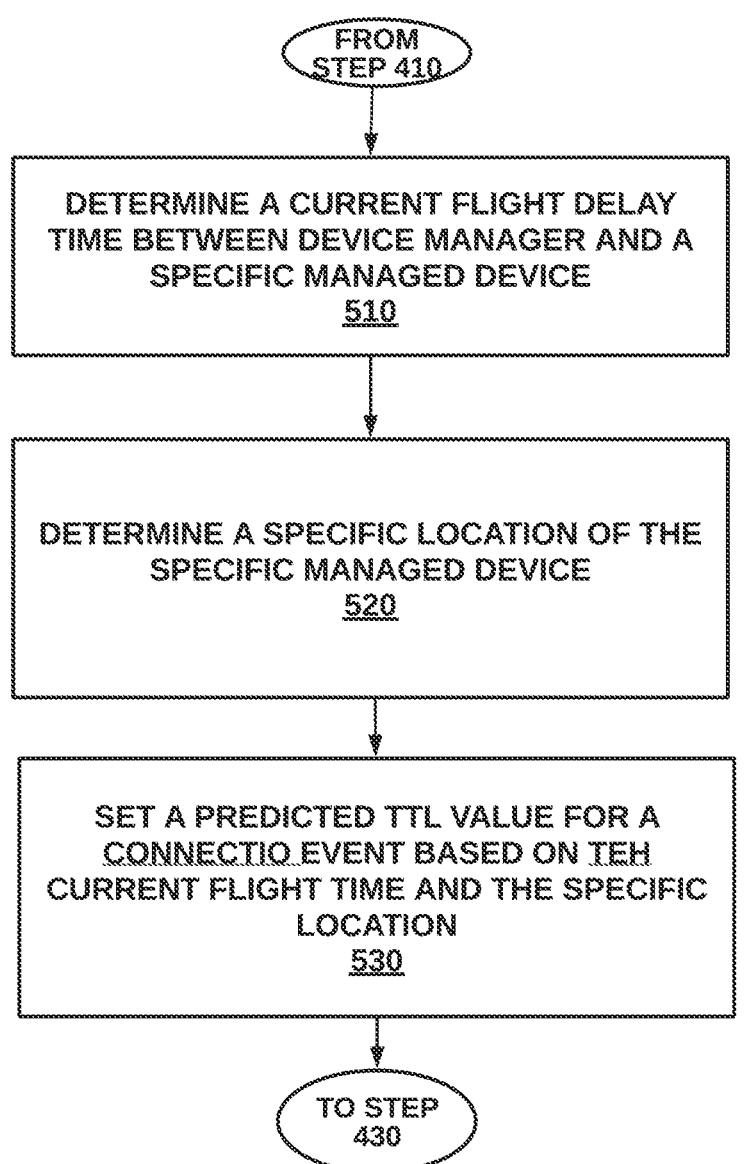
FIG. 5 is a more detailed flow diagram illustrating a step for dynamically setting predicted TTL values for upcoming connection events, from the method of FIG. 3, according to an embodiment.

FIG. 4 sets forth detail for the step 310 of generating the adaptive TTL model from connection events. The step 310 can be performed by, for example, TTL modeling module 210.

At step 410, training data is collected by detecting successful discoveries of any of the plurality of managed devices at various locations on the data communication network, and storing TTL values associated with the successful discoveries at various locations in a TTL database, wherein a TTL value is set to account for a flight delay time and a log-in time prior to expiration of a data packet, the flight delay time comprising a period for data packets to traverse over the data communication network between the device manager and any of the plurality of managed devices and a period for logging in of the network device manager to any of the plurality of managed device.

At step 420, training data can also be collected by detecting failed discoveries of any of the plurality of managed devices at various locations, and detecting iterations of a TTL value needed to reach a successful discovery. More specifically, after each failure, the TTL value can be increased for a better chance of success. The TTL value iterations at various locations are stored in the TTL database.

At step 430, responsive to the successful discoveries, determining a flight time portion for the successful discovery using a ping or a traceroute. The ping or the traceroute includes the flight delay time portion of successful discoveries without a login portion of successful discoveries, and storing the flight delay time portion in the TTL database. The relevant flight delay time portion is approximately half of the round-trip time for the ping or the traceroute. In some cases, flight delay time for unsuccessful discoveries is also recorded.

At step 440, machine learning is utilized to predict TTL values needed for connection events over various flight delay times at various locations. The process returns to step 320 of FIG. 3.

FIG. 5 provides further details concerning the step 330 of dynamically setting predicted TTL values for connection events. One implementation of the step 330 is performed by the TTL updating module 220.

In more detail, from step 320 of FIG. 3, a current flight delay time is determined between the device manager and a specific managed device, at step 510. Next, at step 520, a specific location of the specific managed device is determined. Finally, at step 530, a TTL value for the connection event from predicted TTL values is set using the current flight delay time and the specific location.

III. Computing Device for Machine Learning TTL Value Configuration (FIG. 6)

FIG. 6 is a block diagram illustrating a computing device 600 for use in the system 100 of FIG. 1, according to one embodiment. The computing device 600 is a non-limiting example device for implementing each of the components of the system 100, including the device manager 110 and the managed devices 120A-C. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, or Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a network device manager for using machine learning to dynamically set TTL (Time-To-Live) values for connection events to a plurality of devices managed by the network device manager over a data communication network, the method comprising:

generating an adaptive TTL model from connection events, based on varying flight delay times for connecting the device manager to a plurality of managed devices, including:

collecting training data by detecting successful discoveries of any of the plurality of managed devices at various locations on the data communication network, and storing TTL values associated with the successful discoveries at various locations in a TTL database, wherein a TTL value is set to account for a flight delay time and a log-in time prior to expiration of a data packet, the flight delay time comprising a period for data packets to traverse over the data communication network between the device manager and any of the plurality of managed devices and a period for logging in of the network device manager to any of the plurality of managed device;

collecting training data by detecting failed discoveries of any of the plurality of managed devices at various locations, and detecting iterations of a TTL value needed to reach a successful discovery, and storing the TTL value iterations at various locations in the TTL database;

responsive to the successful discoveries, determining a flight time portion for the successful discovery using a ping or a traceroute, wherein the ping or the traceroute includes the flight delay time portion of successful discoveries without a login portion of successful discoveries, and storing the flight delay time portion in the TTL database; and using machine learning to predict TTL values needed for connection events over various flight delay times at various locations; and during a connection event for any of the plurality of managed devices, automatically updating a TTL value for the connection event from the adaptive TTL model, including:

determining a current flight delay time between the device manager and a specific managed device determining a specific location of the specific managed device; and setting a TTL value for the connection event from predicted TTL values, using the current flight delay time and the specific location.

2. The method of claim 1, further comprising:

setting a maximum TTL for the TTL iterations; and responsive to exceeding the maximum TTL, labeling a managed device of the plurality of managed devices as unreachable.

3. The method of claim 1, wherein the TTL value is set in real-time with the connection event.

4. The method of claim 1, wherein the TTL value is set periodically prior to the connection event.

5. The method of claim 1, wherein the flight delay time comprises half of a time of a round-trip for the ping or the traceroute.

6. The method of claim 1, wherein the log-in portion of the TTL value is constant and the flight time portion is variable.

7. The method of claim 1, wherein the log-in portion of the TTL value is variable.

8. The method of claim 1, wherein the connection event comprises one of an initial discovery connection, a reconnection, and a keep alive connection.

9. The method of claim 1, wherein at least one of the plurality of managed devices is located remotely from an enterprise network including the device manager.

10. The method of claim 1, wherein at least one of the plurality of managed devices is located on a different continent from the device manager.

11. The method of claim 1, wherein at least one of the plurality of managed devices is located within a LAN, and the device manager is also located on the LAN.

12. A non-transitory computer-readable medium in a network device manager for using machine learning to dynamically set TTL (Time-To-Live) values for connection events to a plurality of devices managed by the network device manager over a data communication network, the method comprising:

generating an adaptive TTL model from connection events, based on varying flight delay times for connecting the device manager to a plurality of managed devices, including:

collecting training data by detecting successful discoveries of any of the plurality of managed devices at various locations on the data communication network, and storing TTL values associated with the successful discoveries at various locations in a TTL database, wherein a TTL value is set to account for a flight delay time and a log-in time prior to expiration of a data packet, the flight delay time comprising a period for data packets to traverse over the data communication network between the device manager and any of the plurality of managed devices and a period for logging in of the network device manager to any of the plurality of managed device;

collecting training data by detecting failed discoveries of any of the plurality of managed devices at various locations, and detecting iterations of a TTL value needed to reach a successful discovery, and storing the TTL value iterations at various locations in the TTL database;

responsive to the successful discoveries, determining a flight time portion for the successful discovery using a ping or a traceroute, wherein the ping or the traceroute includes the flight delay time portion of successful discoveries without a login portion of successful discoveries, and storing the flight delay time portion in the TTL database; and using machine learning to predict TTL values needed for connection events over various flight delay times at various locations; and during a connection event for any of the plurality of managed devices, automatically updating a TTL value for the connection event from the adaptive TTL model, including:

determining a current flight delay time between the device manager and a specific managed device determining a specific location of the specific managed device; and setting a TTL value for the connection event from predicted TTL values, using the current flight delay time and the specific location.

13. A network device manager for using machine learning to dynamically set TTL (Time-To-Live) values for connection events to a plurality of devices managed by the network device manager over a data communication network, the network device manager comprising:

a processor;

a network interface communicatively coupled to the processor and to the WLAN; and a memory, communicatively coupled to the processor and storing:

a TTL modeling module, to generate an adaptive TTL model from connection events, based on varying flight delay times for connecting the device manager to a plurality of managed devices, including:

a training module to collect training data by detecting successful discoveries of any of the plurality of managed devices at various locations on the data communication network, and storing TTL values associated with the successful discoveries at various locations in a TTL database, wherein a TTL value is set to account for a flight delay time and a log-in time prior to expiration of a data packet, the flight delay time comprising a period for data packets to traverse over the data communication network between the device manager and any of the plurality of managed devices and a period for logging in of the network device manager to any of the plurality of managed device, wherein the training module collects training data by detecting failed discoveries of any of the plurality of managed devices at various locations, and detecting iterations of a TTL value needed to reach a successful discovery, and storing the TTL value iterations at various locations in the TTL database;

a flight time module to, responsive to the successful discoveries, determine a flight time portion for the successful discovery using a ping or a traceroute, wherein the ping or the traceroute includes the flight delay time portion of successful discoveries without a login portion of successful discoveries, and storing the flight delay time portion in the TTL database;

a machine learning module to, use machine learning for predicting TTL values needed for connection events over various flight delay times at various locations; and a TTL updating module, during a connection event for any of the plurality of managed devices, automatically updates a TTL value for the connection event from the adaptive TTL model, by determining a current flight delay time between the device manager and a specific managed device, determining a specific location of the specific managed device, and setting a TTL value for the connection event from predicted TTL values, using the current flight delay time and the specific location.

* * * * *